(12) United States Patent
Kumar P S et al.

(10) Patent No.: US 9,325,890 B2
(45) Date of Patent: Apr. 26, 2016

(54) METHOD AND SYSTEM TO CONTROL A CAMERA OF A WIRELESS DEVICE

(75) Inventors: Sampath Kumar P S, San Diego, CA (US); Srilakshmi Madala, San Diego, CA (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1442 days.

(21) Appl. No.: 11/090,572

(22) Filed: Mar. 25, 2005

(65) Prior Publication Data

US 2006/0215011 A1    Sep. 28, 2006

(51) Int. Cl.
*H04M 3/00* (2006.01)
*H04N 5/232* (2006.01)
*H04W 12/12* (2009.01)
*H04M 1/725* (2006.01)
(Continued)

(52) U.S. Cl.
CPC ............ *H04N 5/232* (2013.01); *H04M 1/66* (2013.01); *H04M 1/72519* (2013.01); *H04M 1/72572* (2013.01); *H04N 1/00209* (2013.01); *H04N 1/00212* (2013.01); *H04N 1/00307* (2013.01); *H04N 1/00973* (2013.01); *H04N 7/183* (2013.01); *H04W 4/025* (2013.01); *H04W 4/028* (2013.01); *H04W 4/16* (2013.01); *H04W 12/00* (2013.01); *H04W 12/12* (2013.01); *H04M 2250/10* (2013.01); *H04N 2201/0075* (2013.01)

(58) Field of Classification Search
CPC ..... H04W 84/18; H04W 76/02; H04W 88/06; H04W 48/16; H04W 4/12; H04W 84/12; H04W 8/24; H04W 12/02; H04W 28/04; H04W 40/246; H04W 8/005; H04W 8/245; H04W 4/00; H04W 84/20; H04W 84/22; H04W 88/02; H04N 5/23206; H04N 5/232; H04N 2101/00; H04N 2201/0084; H04N 2201/0015; H04N 1/00161; H05B 37/0272; H05B 33/0842; H01Q 1/241
USPC ................. 348/211.99, 211.1–9, 211.2, 211, 348/231.99, 220.1, 148, 291, E5.042, 348/14.02, 207.1, 207.11, 207.99, 158, 348/211.4; 725/62; 455/41.2, 412, 411, 455/419, 410, 420, 456.4, 456.1, 556.1, 455/404.2, 41.3, 422.1; 396/56, 180
See application file for complete search history.

(56) References Cited

U.S. PATENT DOCUMENTS 6,122,005 A * 9/2000 Sasaki et al. ............... 348/211.3
6,671,520 B1 * 12/2003 Kim ........................... 455/556.1

(Continued)

OTHER PUBLICATIONS

"USSD—a Whatis.com definition—see also: Unstructured Supplementary Service Data". [Retrieved Jan. 25, 2005] Retrieved from Internet: URL: <http://searchnetworking.techtarget.comsDefinition/0,,sid7_gci803403.00.html >, 1pg.

(Continued)

*Primary Examiner* — Fred Casca
(74) *Attorney, Agent, or Firm* — Staas & Halsey LLP (57) ABSTRACT

Apparatuses and methods for a wireless device to provide receiving a signal to control an operation of an image capture device of a wireless device, the signal including an identifier to identify an intended recipient of the signal, operating the image capture device, in accordance with the received signal, to capture at least one image, and transmitting a message from the wireless device, the transmitted message including the at least one captured image.

20 Claims, 4 Drawing Sheets

(51) Int. Cl.
  *H04W 4/02* (2009.01)
  *H04W 4/16* (2009.01)
  *H04M 1/66* (2006.01)
  *H04W 12/00* (2009.01)
  *H04N 1/00* (2006.01)
  *H04N 7/18* (2006.01)

(56) References Cited

U.S. PATENT DOCUMENTS

| | | |
|---|---|---|
| 6,704,040 B2 | 3/2004 | Sato |
| 6,836,726 B2 | 12/2004 | Sánchez Peiro |
| 2003/0018975 A1 | 1/2003 | Stone |
| 2003/0038878 A1 | 2/2003 | Lee et al. |
| 2003/0109288 A1* | 6/2003 | Carley et al. ............... 455/567 |
| 2003/0117497 A1 | 6/2003 | Nicolaisen et al. |
| 2005/0221799 A1* | 10/2005 | Tervo et al. ............... 455/411 |
| 2005/0245273 A1* | 11/2005 | Kincaid ............... 455/456.4 |
| 2006/0026649 A1* | 2/2006 | Shieh ............... 725/62 |
| 2006/0128305 A1* | 6/2006 | Delalat ............... 455/41.2 |
| 2006/0146140 A1* | 7/2006 | Kennedy ............... 348/211.2 |

OTHER PUBLICATIONS

"Nokia Remote Camera", Nokia—Imaging Enhancements. [Retrieved Jan. 25, 2005] Retrieved from Internet: URL: <http://www.nokia.com/nokia/0,,63911,00.html > 6pgs.

* cited by examiner

METHOD AND SYSTEM TO CONTROL A CAMERA OF A WIRELESS DEVICE

BACKGROUND

The present disclosure relates generally to wireless devices, and more particularly to a method and apparatus for remotely controlling an image capture device of a wireless device such as a camera.

Modern wireless devices may include a number of components and/or functionalities. A sampling of the type of components that may be included in a wireless device are, for example, a memory, a controller, a speaker, a microphone, and a graphics display. A wireless device may operate to provide various services and features.

A popular feature included in a number of wireless devices is an image capture device, such as a camera. Wireless devices including a camera are typically controlled using a user interface control and/or button located on the wireless device. The user interface control and/or button located on the wireless device may be used to control capture of an image in an area surrounding the wireless device.

However, there exists a need to provide an efficient device, system, method, and means for remotely controlling an operation of an image capture device of a wireless device.

SUMMARY

In some embodiments hereof, an apparatus is provided. Some of the apparatuses may include a wireless device such as, for example, a cellular telephone. The apparatus may include a processor; a radio frequency (RF) transmitter/receiver, operatively coupled to the processor, for receiving and transmitting information; a memory operatively coupled to the processor and storing software to control the processor; and an image capture device. The software may include executable program instructions which, when executed, control the processor to control an operation of the camera to capture at least one image in response to a signal received by the radio frequency (RF) transmitter/receiver, the received signal including an identifier to identify an intended recipient of the signal, and control the radio frequency (RF) transmitter/receiver to transmit a message including the at least one captured image.

In some embodiments hereof, a method is provided. Some of the methods may include receiving a signal to control an operation of an image capture device of a wireless device, the signal including an identifier to identify an intended recipient of the signal; operating the image capture device, in accordance with the received signal, to capture at least one image; and transmitting a message from the wireless device, the transmitted message including the at least one captured image.

These and further aspects hereof may be more clearly understood by reference to the following detailed description, the appended claims, and to the several drawings attached herein.

BRIEF DESCRIPTION OF THE DRAWINGS

The accompanying drawings, which are incorporated in and form a part of the specification, illustrate some embodiments of the present invention, and together with the description serve to explain the principles therein.

DETAILED DESCRIPTION

Figure 1:
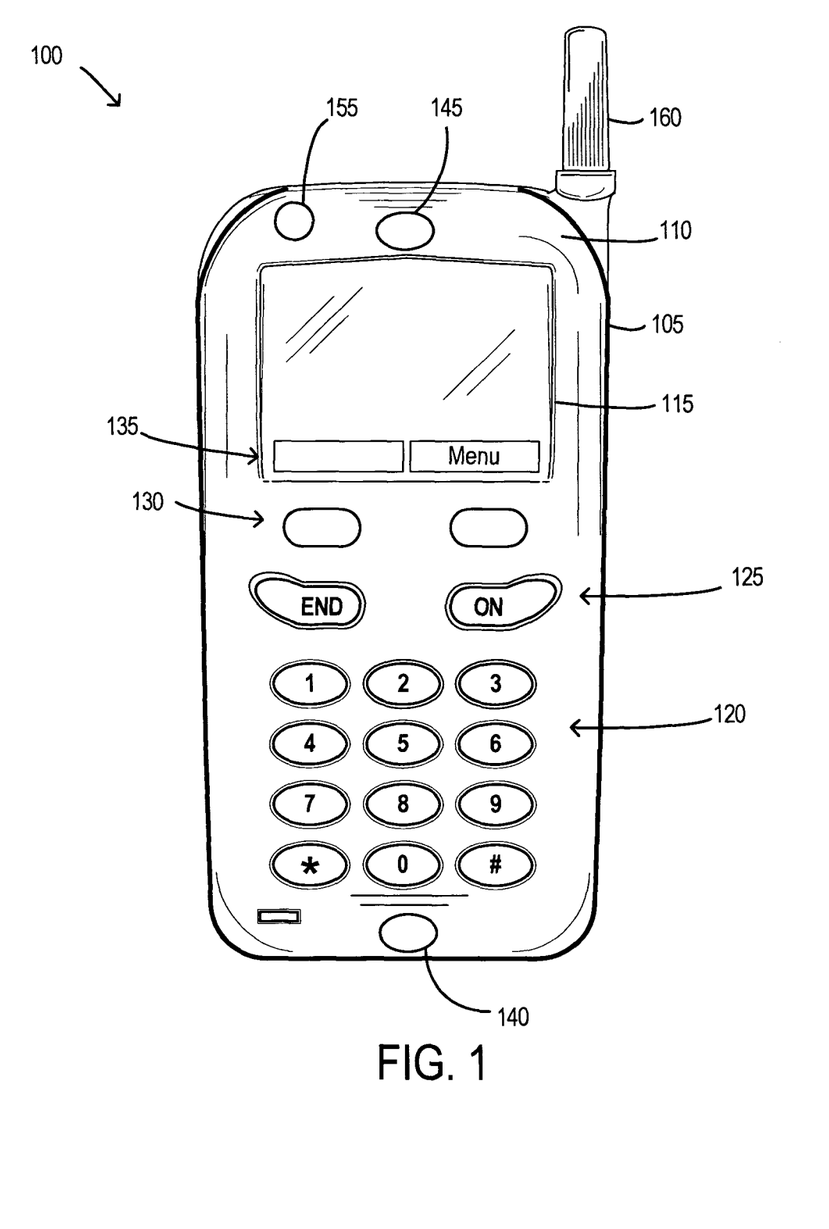
FIG. 1 is an exemplary illustrative embodiment of an apparatus according to some embodiments hereof.

Referring to FIG. 1, there is shown an exemplary illustration of an embodiment of an apparatus, a wireless device, according to some embodiments hereof. The wireless device is generally represented by numeral 100. Wireless device 100 may include various components, functionalities, and technologies to provide a variety of features and capabilities, including multimedia capabilities. Wireless device 100 may include, as an example, a cellular telephone, a wireless telephone, a personal digital assistant (PDA), a push-to-talk (PTT) walkie talkie, a handheld personal computer (PC), a combination of these and other devices, and any other device that may include the same, like or other functionality in accordance with the present disclosure.

Wireless device 100 may be programmed to perform certain functions (e.g., to operate in various modes and execute various actions) in accordance with aspects of the present disclosure. The program instructions or code may be stored in a memory device resident in wireless device 100. The memory, in some embodiments, may be removably connected wireless device 100. For example, a memory including programming that when executed implements some of the methods and functions disclosed herein may be stored on a memory device such as, but not limited to, those commonly referred to as compact flash, secure digital, memory stick, smart media, multimedia, and microdrive. A removable memory device may be received in a socket (not shown) configured to accept the memory device. The socket may be located in wireless device 100 and at least operatively connected thereto.

Wireless device 100 includes a housing 105, including a front housing 110 that may be shaped and sized to fit in a user's hand. Other components of wireless device 100, described in greater detail below, are mounted on, to, or within housing 105.

Wireless device 100 includes a display 115 that is mounted to front housing 110. Wireless device 100 also includes a numeric keypad 120. Keypad 120 may be mounted on, in, or through front housing 110 such that keypad 120 is accessible to the user. Wireless device 100 may include a number of certain, fixed function keys 125. Fixed function keys 125 may be associated with a predetermined function and/or feature of wireless device 100. For example, fixed function keys 125 may operate to initiate and terminate certain features and functions such as power. Functions keys 125 may be labeled, as shown, as ON and END.

Wireless device 100 may have a number of keys commonly referred to as "soft" function keys 130. Softkeys are accessible from front housing 110. A function associated with softkeys 130 will vary in accordance with a function label 135 displayed on display 115.

Front housing 110 may include a microphone 140 for receiving an audio signal and a speaker 145 for broadcasting an audio signal. Wireless device 100 may include a camera 155 for receiving a visual signal. In some embodiments, camera 155 may include functionality for receiving infrared (IR) signals.

Wireless device 100 may include a motion detector 260 (shown in FIG. 2) for receiving a signal indicative or representative of a motion or movement in the vicinity of the wireless device. Motion detector 260 may be included as part of another component of wireless device 100 such as, for example, camera 210.

Housing 105 may include these and/or other keys, components, and the like on a front housing thereof and other portions of housing 105, including a back, a top, and sides of housing 105 that are not shown, so as to simplify the exemplary illustration of FIG. 1. Further, wireless device 100 may include keys, a battery, components, and the like (not shown for purposes related to clarity of the drawing) that are concealed from view by, for example, portions of housing 105 that are selectively moveable to conceal these other keys, components, and the like.

An antenna 160 extends from the top of housing 105. Antenna 160 is operatively coupled to a receiver/transmitter and aids in the transmission and reception of radio frequency (RF) signals transmitted and received by the receiver/transmitter. Antenna 160 may or may not be extendable to a length other than that illustrated in FIG. 1. Antenna 160 may, in some embodiments, be housed entirely within housing 105.

Figure 2:
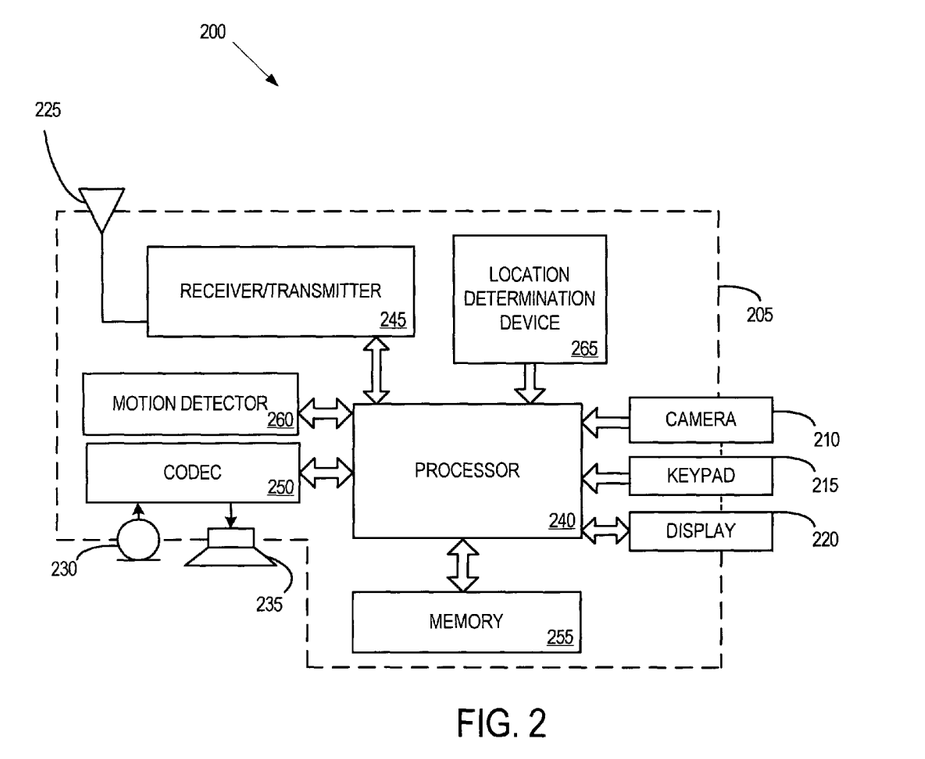
FIG. 2 is a block diagram of some potential components for the apparatus of FIG. 1, in accordance with some embodiments hereof.

FIG. 2 is an exemplary block diagram of some potential components for the apparatus of FIG. 1, in accordance with some embodiments of the present disclosure.

As illustrated in FIG. 2, wireless device 200 includes a processor 240. Processor 240 may be a microprocessor, microcontroller and/or digital signal processor (DSP) or other control circuit provided in a wireless device. Also included in wireless device 200 is a memory component 255. Memory 255 may include one or more of ROM (read only memory), RAM (random access memory, e.g., static RAM, dynamic, etc.), and flash memory. Processor 240 is operatively connected to (i.e., in data communication with) memory 255. Memory 255 may store software code, instructions, including programs that control operation of the processor 245.

Some of the software of wireless device 200 may be provided in accordance with the present disclosure to cause processor 245 to perform functions further described below.

A codec (coder/decoder) 250 may be included in wireless device 200. Codec 250 is, operatively connected, in data communication with the processor 245. A receiver/transmitter 245 is operatively coupled to codec 85. Receiver/transmitter 245 is operatively coupled to antenna 225. Receiver/transmitter 245 may comprise a combination of two or more different receive/transmit modules (not separately shown) that operate in accordance with mutually different radio communication protocols to provide various services for wireless device 200. For example, receiver/transmitter 245 may operate in accordance with one radio communication protocol to provide conventional cellular two-way service for wireless device 200, and may operate in accordance with another radio communication protocol to provide PTT service for wireless device 200. Wireless device 200 may operate in accordance with a number of communication standards, such as, for example, GPRS (General Packet Radio Service), EDGE (Enhanced Data GSM Environment), UMTS (Universal Mobile Telephone Service).

Microphone 230 is operatively coupled to codec 250 to provide audio (e.g., voice) input signals to codec 250. A speaker 235 is operatively coupled to codec 250. Speaker 235 may be driven by codec 250 to provide audible output therefrom.

Keypad 215 and an image capture device such as, for example, a charge coupled device (CCD) and camera 210 are operatively coupled to processor 245. Display 220 is operatively coupled to processor 245 to provide a display area for graphical output. The graphical output may include text and graphics. The graphics may include image data such as still photograph images and a motion video. The graphical output may be stored in memory 80 or received by receiver/transmitter 90 (e.g., photographs and streaming video). Display 220 may form, in part, a graphical user interface of wireless device 200. In some embodiments hereof, display 220 may include a touch-sensitive screen to receive input from a user of wireless device 200.

It should be understood that the block diagram representation of wireless device 200 shown in FIG. 2 is simplified in a number of ways. For example, certain power, and power management components of wireless device 200 are omitted from the drawing.

Figure 3:
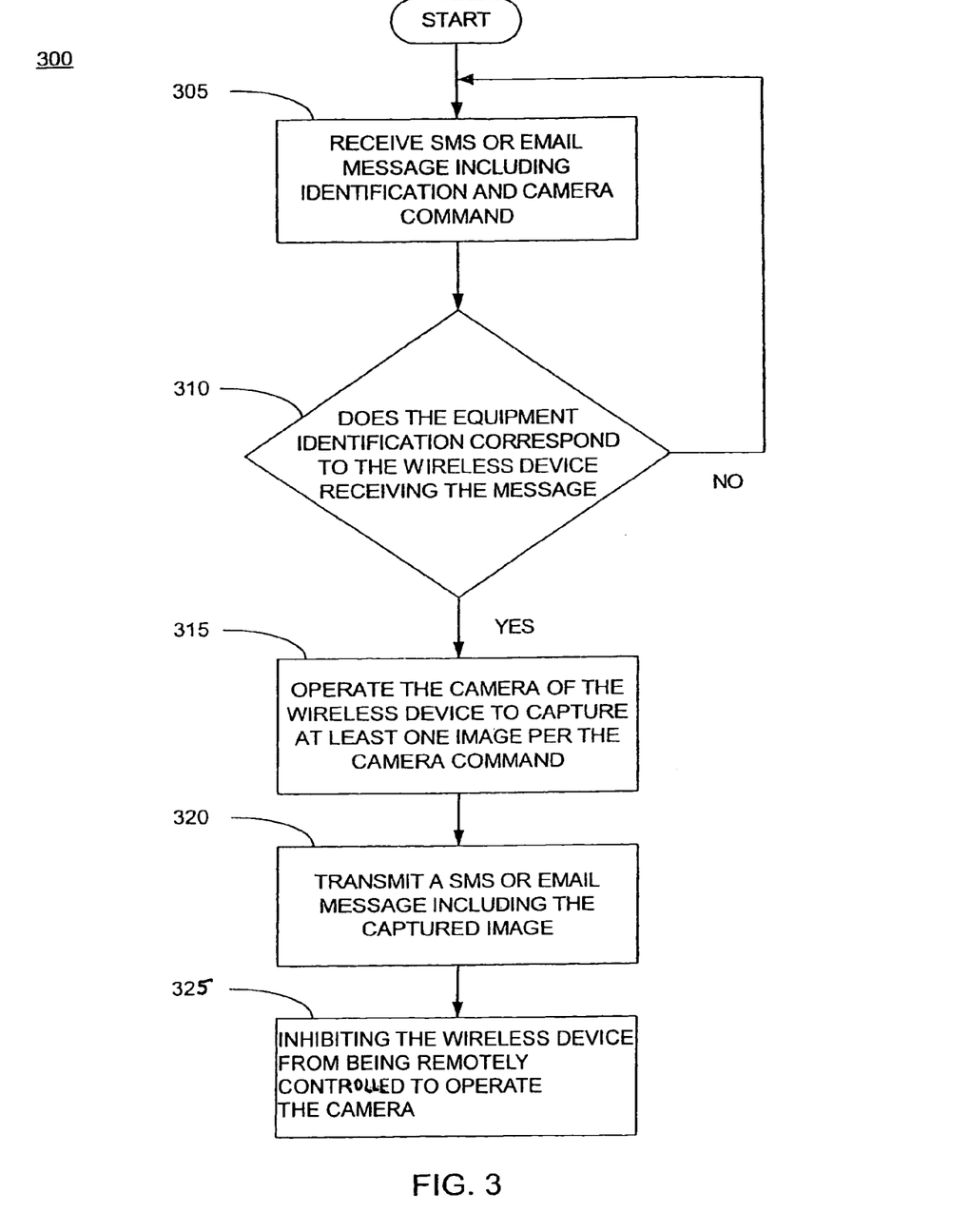
FIG. 3 is a flow diagram of an exemplary method in accordance with some embodiments hereof.

FIG. 3 is an exemplary flow diagram that illustrates a process 300 that may be performed by wireless device in accordance with some aspects of the present disclosure. Process 300 relates to controlling an operation of a wireless device. In particular, process 300 depicts an exemplary process for controlling a wireless device to operate an image capture device thereof remotely.

The methods of operation disclosed herein are not limited by any title or descriptor associated therewith, but in general are associated with the operations, steps, process, functions, etc. used, disclosed, and suggested in the description of the methods.

Process 300 may be implemented by a software program, application, applet, and code stored in one or more of memory devices resident in or accessible by the wireless device, such as, for example, memory 255 shown in wireless device 200 of FIG. 2. In some embodiments, memory 255 may be removably received in the wireless device. For example, the memory including a program, instruction, or code for implementing method 300 may be a SIM (Subscriber Identification Module), USIM (Universal Subscriber Identification Module), or any other resident memory, removable memory, memory store accessible to the wireless device, including a proprietary memory format.

At operation 305, the wireless device (e.g., 100, 200) may receive a signal to control an operation of the image capture device connected to wireless device 100, 200. Regarding the ability to control an operation of the image capture device, the received signal may include a command signal or command structure that can be used to direct an operation of the image capture device. The received signal may be of a number of different types. For example, the received signal may be formatted as a short message service (SMS) message or an email message. The signal is received via a wireless communication link by the wireless device. The format, protocol, frequency, etc. of the communication link, carrier signal, and network thereof may vary depending on the operational characteristics of the wireless device.

The received signal may be received by a transmitter/receiver (e.g., 245) operatively connected to the wireless device. The transmitter/receiver, or other components, may include functionality to condition the received signal for use, interface, and processing.

As indicated at operation 305, the received signal may include an identifier. In some embodiments, the identifier identifies an intended recipient of the signal to control the image capture device (e.g., 210). The identifier may be used, in some embodiments, to route the received signal of operation 305 to the wireless device designated thereby. In some embodiments, the wireless device has an identifier associated therewith that uniquely identifies the wireless device and distinguishes it from other devices, including, for example, other wireless devices. The identifier may include an International Mobile Equipment Identifier (IMEI). The IMEI is a unique 15-digit number that serves as a serial number of a GSM handset (i.e., wireless device). The IMEI uniquely identifies a mobile unit handset within a wireless carrier's network.

In some embodiments, the identifier may reference more than one particular wireless device. That is, in some embodiments the received signal to control an image capture device of the wireless device includes an identifier that references more than one wireless device. Each of the more than one wireless devices may be separately identified by a distinct identifier that is included with or associated with the received signal of operation 305.

It should be appreciated that the identifier associated with the received signal of operation 305 may include identifiers that designate or address wireless devices in a number of ways. For example, the included identifiers may include identifiers that address wireless devices individually, as a collective of wireless devices, and combinations thereof.

In some embodiments, there need not be any action at the wireless device to receive the signal at operation 305. That is, the signal may be received without any prior or concurrent action locally at the wireless device 100, 200. In some embodiments, a remote operation of the image capture device 155, 210 as described herein may be inhibited (for example, operation 325 in FIG. 3 and operation 425 in FIG. 4) by activation of a mode of operation, sequence of actions, etc. at the wireless device or by a service provider to block a remote operation of the image capture device thereof. However, in these embodiments, the received signal may override, bypass, or otherwise supersede an attempt to prohibit or limit remote operation of the image capture device 155, 210. The received signal may, in some embodiments, include an indication, signal, flag, code, etc, that allows wireless device 100, 200 to be remotely controlled by the received signal.

At operation 310, a determination is made whether the identifier included in the signal received at operation 305 to control an operation of an image capture device of wireless device 100, 200 corresponds to the wireless device that received the signal. In an instance the identifier in the received signal does not correspond to an identifier associated with the wireless device 100, 200, then process 300 returns to a point before operation 305.

In an instance the identifier in the received signal does correspond to an identifier associated with the wireless device 100, 200, then process 300 proceeds to operation 315. At operation 315, camera 155, 210 is operated to capture at least one image. The operation of camera 155, 210 may be carried out per the command signal, command structure, etc. included or associated with the received signal. In some embodiments, operation 315 may invoke a routine, program, or sequence of processes that direct the image capture operation.

In some embodiments, depending on a capability of the camera 155, 210 of wireless device 100, 200, the camera may capture, a still image photograph, motion video, streaming video, infrared image/video, panoramic view image/video, etc.

In some embodiments, the at least one captured image may include a still image (i.e., a photograph), a video clip, streaming video, other video data, (e.g., infrared image), and combinations thereof. In some embodiments, the particular at least one image captured by the camera may be determined by signal received at operation 305. In some embodiments, the particular at least one image captured by the camera may be determined by a capability of the camera 155, 210. For instance, if the received signal includes an indication for wireless device 100, 200 to capture video data but camera 155, 210 can only capture still photographs then the camera may capture still photographs given the capability of the camera.

In some embodiments, the operation of camera 155, 210 is not restricted or limited by the fact that the camera is remotely controlled in accordance with the various methods disclosed herein. That is, operation of the camera is not compromised or reduced by the camera being operated remotely via a wireless communication link as disclosed in some embodiments herein.

At operation 320, wireless device 100, 200 transmits a message therefrom that includes the at least one captured image. The format and protocol of the transmitted message may vary. The transmitted message may be, for example, at least one of a SMS (Short Message Service) message, a MMS (Multimedia Message Service) message, and an electronic mail message type of message. In the instance the message transmitted at operation 350 is a MMS message, the image is transmitted in a body of the message, obviating a need to append an attachment to the message as may be case with other types of messages.

The at least one image transmitted at operation 320 may be transmitted to an entity (e.g., an email account, another wireless device, a portable email reader, etc.) from which the signal received at operation 305 originated. In some embodiments, the at least one image transmitted at operation 320 may be transmitted to an entity other than that from which the signal received at operation 305 originated. In some embodiments, an intended recipient of the transmitted message of operation 320 may be indicated, addressed, or otherwise specified in the transmitted message.

In some embodiments, the message received at operation 305 may be a mobile terminated (MT) SMS message and the message transmitted from wireless device 100, 200 at operation 320 may be a mobile orignated (MO) MMS message. As should be appreciated, the MT SMS message is addressed to one wireless device. The MO SMS may include an indication of the wireless device transmitting the message.

Figure 4:
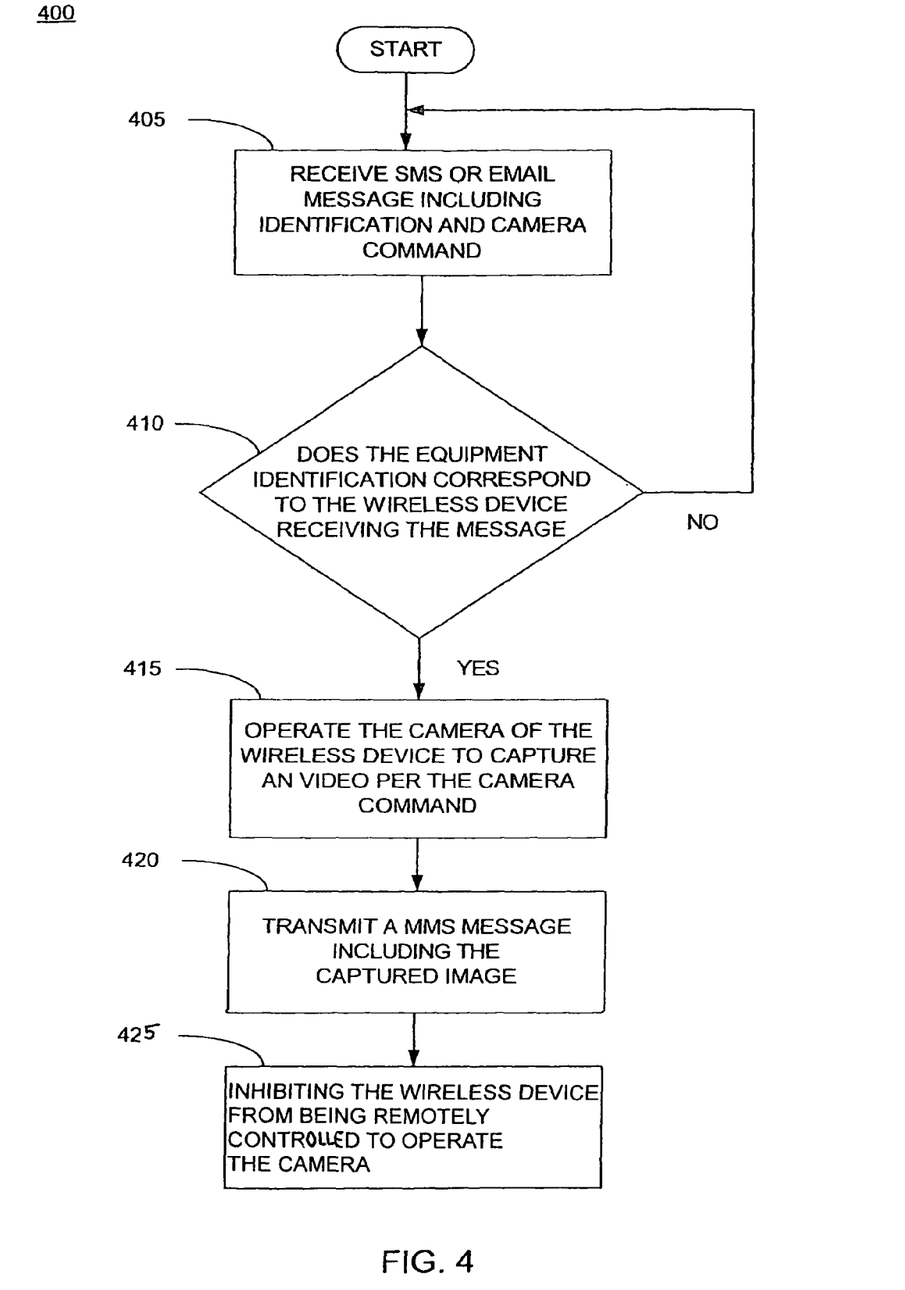
FIG. 4 is a flow diagram of an exemplary method in accordance with some embodiments hereof.

FIG. 4 is an exemplary flow diagram of a process 400, according to some embodiments. Process 400 is similar in some respects to process 300. For example, a message (e.g., SMS or email) is received at operation 405 that includes an identifier of an intended recipient of the message. At operation 410, a determination is made whether the wireless device that received the signal of operation 405 has an identifier that corresponds thereto.

At operation 415, the camera of the wireless device (i.e., the intended recipient) is operated to capture video data. The video data may, in some embodiments, be stored in a memory of the wireless device. The frame rate and other particulars of the captured video data may be based on a command signal or command structure included in the received signal of operation 405. In some embodiments, the characteristics of the captured video may be determined based on a capability of the camera and the wireless device. For example, in some embodiments, the resources available for use by the camera and wireless device (e.g., memory, battery life, transmission bandwidth, signal strength, etc.) may determine the frame rate, resolution, etc. of the captured video or image data.

The video data may be transmitted in a MMS message at operation 420. The MMS message transmitted at operation 420 may include other data types, such as text, voice, graphics, music, etc. In this manner, the capture of the video transmitted at operation 420 is controlled remotely.

It should be appreciated that the flow diagrams of FIGS. 3 and 4 are illustrative examples according to some embodiments of the present disclosure. However, the order of the operations in FIGS. 3 and 4 are not meant to place any limitations on the sequence or number of operations, steps, or processes of the present disclosure. According, the methods herein may be performed in any number of applicable steps and orders.

In some embodiments herein, other functions of the wireless device 100, 200 may operate during or as part of the camera remote control operation disclosed herein. For example, a conventional voice call operation (both originating and receiving) may operate to place and receive calls while the camera of the wireless device is remotely controlled.

In some embodiments, a memory accessible to a wireless device hereof and/or operations of the wireless device may be used to store at least some of the messages transmitted by the wireless device. Such stored MMS messages may be beneficial in reviewing, recreating, or otherwise learning about image data or video data associated with a camera remote control operation. Achieved or stored MMS messages may be stored in a database, a folder, a server, or other data construct without limit.

In some embodiments, the methods disclosed herein may be embodied in executable code or instructions. For example, the code or instructions may be stored in applications, applets, modules, etc. stored in memory 255 and executed by processor 240.

While the apparatus and methods of the present disclosure have been described in detail in the foregoing embodiments, it is to be understood that the descriptions have been provided for purposes of illustration only and that other variations, both in form and detail, can be made thereupon by those skilled in the art without departing from the spirit and scope of the invention, which is defined solely by the appended claims.

What is claimed is:

1. A method of operating a wireless device, comprising:
    activating an inhibit mode of operation for the wireless device in which remote operation of an image capture device is inhibited;
    wirelessly receiving a signal to override the inhibit mode so as to remotely control the operation of the image capture device of the wireless device, the signal including an identifier to uniquely identify the wireless device wherein the identifier comprises an International Mobile Equipment Identifier (IMEI);
    operating the image capture device remotely based only on whether the identifier included in the signal is the IMEI for the wireless device, in accordance with the received signal, to capture at least one image; and
    transmitting a message from the wireless device, the transmitted message including the at least one captured image,
    wherein the image capture device captures video data and wherein the wirelessly received signal specifies the characteristics of the video data including the frame rate.

2. The method of claim 1, further comprising determining the wireless device is the intended recipient of the received signal.

3. The method of claim 2, wherein the determining comprises comparing the identifier with the IMEI for the wireless device.

4. The method of claim 1, wherein the received signal comprises a message.

5. The method of claim 4, wherein the received signal comprises a SMS (Short Message Service) message or an electronic mail message.

6. The method of claim 1, wherein the wireless device is not operated in accordance with the received signal to override the inhibit mode in an instance the wireless device is not the intended recipient of the received signal.

7. The method of claim 1, wherein the at least one captured image is transmitted in a body of the message.

8. The method of claim 7, wherein the transmitted message is a MMS (Multimedia Message Service) message.

9. The method of claim 1, wherein the at least one captured image comprises video.

10. The method of claim 1, wherein the message is transmitted to an entity from which the signal is received.

11. A wireless device comprising:
    a processor;
    a radio frequency (RF) transmitter/receiver, operatively coupled to the processor, for receiving and transmitting voice and data information;
    a camera operatively coupled to the processor; and
    a memory operatively coupled to the processor and storing code to control the processor to:
        activate an inhibit mode operation for the wireless device in which remote operation of an image capture device is inhibited;
        override the inhibit mode so as to remotely control an operation of the camera to capture at least one image in response to a signal received wirelessly by the radio frequency (RF) transmitter/receiver, the wirelessly received signal including an identifier to uniquely identify the wireless device, wherein the identifier comprises an International Mobile Equipment Identifier (IMEI), and the operation of the camera to capture the at least one image is remotely controlled based only on whether the identifier is the IMEI for the wireless device; and
        control the radio frequency (RF) transmitter/receiver to transmit a message including the at least one captured image,
    wherein the image capture device captures video data and wherein the wirelessly received signal specifies the characteristics of the video data including the frame rate.

12. The wireless device of claim 11, wherein the processor controls the wireless device to transmit and receive at least one message type selected from the group consisting of: a SMS (Short Message Service) message, a MMS (Multimedia Message Service) message, and an electronic mail message.

13. The wireless device of claim 11, further comprising code to control the processor to determine whether the wireless device is the intended recipient of the received signal.

14. The wireless device of claim 11, wherein the received signal comprises a message.

15. The wireless device of claim 11, wherein the inhibit mode is not overridden in an instance the wireless device is not the intended recipient of the received signal.

16. The wireless device of claim 11, wherein the transmitted message comprises a MMS message.

17. The wireless device of claim 11, wherein the camera captures video.

18. The wireless device of claim 11, wherein the message is transmitted to an entity from which the signal is received.

19. The method of claim 1, further comprising conducting a voice call operation using the wireless device while using the wireless device to remotely operate the image capture device.

20. The method of claim 1, wherein the transmitting the message includes transmitting the message to a device which is different from a device which provided the wirelessly received signal.

* * * * *